US005254389A

United States Patent [19]

Tether

[11] Patent Number: 5,254,389

[45] Date of Patent: * Oct. 19, 1993

[54] VOID FILL MATERIAL

[75] Inventor: Russell W. Tether, Dallas, Tex.

[73] Assignee: Corropak, Inc., Dallas, Tex.

[ * ] Notice: The portion of the term of this patent subsequent to Oct. 13, 2010 has been disclaimed.

[21] Appl. No.: 959,774

[22] Filed: Oct. 13, 1992

Related U.S. Application Data

[63] Continuation-in-part of Ser. No. 804,995, Dec. 11, 1991, Pat. No. 5,188,880.

[51] Int. Cl.$^5$ .......... B32B 3/10

[52] U.S. Cl. .......... 428/131; 428/2; 428/33; 428/119; 428/120; 428/133; 428/182; 206/584; 206/814; 493/967; D9/456

[58] Field of Search .......... 428/2, 33, 119, 120, 428/131, 133, 182; 206/584, 814; 493/967; D9/456

[56] References Cited

U.S. PATENT DOCUMENTS 3,074,543 1/1963 Stanley .......... 206/46
3,188,264 6/1965 Holden .......... 161/168
3,559,866 2/1971 Olson, Sr. .......... 229/14
3,894,632 7/1975 Sieffert .......... 206/424
3,951,730 4/1976 Wennberg et al. .......... 428/116
4,120,443 10/1978 Gardner et al. .......... 229/42
4,169,179 9/1979 Bussey, Jr. .......... 428/159
4,514,453 4/1985 Bussey, Jr. .......... 428/159
4,621,022 11/1986 Kohaut et al. .......... 428/397

*Primary Examiner*—Patrick J. Ryan
*Assistant Examiner*—Marie R. Macholl
*Attorney, Agent, or Firm*—Hubbard, Thurman, Tucker & Harris

[57] ABSTRACT

A void fill material (10) can be formed from ordinary scrap cardboard into an interlocking packaging material. Each piece of the material (10) has a primary section (20) defining a primary plane. The void fill has at least two limbs extending from the primary section. The void fill can be in any geometric shape, such as a block Y (10), a block H (62), an angled Y (80), an X (100), and a cross (120). Scoring can be applied to the void material at any location, thereby facilitating the deformation of the void fill.

19 Claims, 3 Drawing Sheets

VOID FILL MATERIAL

The present application is a continuation-in-part of co-pending application Ser. No. 07/804,995, filed on Dec. 11, 1991 (now U.S. Pat. No. 5,188,880) and also entitled "VOID FILL MATERIAL".

TECHNICAL FIELD OF THE INVENTION

The present invention relates to void fill material for use in packaging. In particular, the present void fill material is made by recycling corrugated cardboard and the like and is designed to interlock with adjacent void-fill material.

BACKGROUND OF THE INVENTION

Today's environmental emphasis is changing the way many companies and consumers do business. It is no longer acceptable to just provide quality products at the lowest cost. Today's users are requiring companies to consider the long term effects of products and their manufacture. From aerosols to diapers to packaging, products must not be a detriment to the environment.

There are many void fill materials on the market today. These products are made from expanded polystyrene, shredded wood, corn starch, shredded paper, and popcorn. For example, shredded wood, known as "excelsior", is used a great deal in overseas shipping. It provides reasonable protection, but is expensive and is not as effective as other fill material for small and delicate products. It also requires hand packing, since it will not "flow" through any void fill machinery. Hand packing has been known to cause a condition known as Carpal Tunnel Syndrome and, therefore, the increased incidence of worker's compensation.

Shredded paper was once in common use. However, the paper settles and, therefore, does not provide the cushioning most users require. It does not flow and is also very messy. If the source of the paper is newspaper, the ink comes off on the product and the packer's hands. The paper cannot be easily handled. Reaching into the container and packing it by hand is required, also potentially leading to Carpal Tunnel Syndrome. Shredded paper also attracts paper mites.

"Ecopak ®" is a new product on the market made of 95% corn starch with other chemicals making up the other 5%. This product costs about $0.75 per cubic foot with a target price of $0.55 per cubic foot. This is double the cost of current void fills. In humid or wet conditions, the product will disintegrate, leaving a residue on the product and degrading its ability to cushion. It is biodegradable, but not recycled.

Popcorn showed promise as a void fill material, but has now been banned by the F.D.A. for use in packing because people might eat it. Popcorn also attracts insects because it is a food source containing natural oils. These oils can also rub off on the packaged product.

Polystyrene "peanuts" are the most common form of void fill packing material. They come in many forms: "S", "J", "W", "C" and a concave disk shape. All "peanuts" have a petrochemical base. Most use Chlorofluorocarbons (CFC's) in production. CFC's are considered to contribute to the deterioration of the ozone layer of the earth's atmosphere. Polystyrene is also a danger to the environment because it does not decompose. Sold to converters as a bead, the polystyrene is heated and expanded to the desired shape. It offers protection to the products packaged. However, "peanuts" tend to settle, allowing the product to shift to an unprotected position within the box. The letter-shaped peanuts offer more cushioning than do the disk-shaped ones. The disk flattens with little pressure. Once flattened, the disk-shaped peanut offers only the cushioning of its thickness (approximately 1/32 inch). Polystyrene costs range from $0.25 to $0.35 per cubic foot. One advantage is that it can be stored in hoppers mounted to the inside roof of a building and over the packing stations. The peanuts are blown into hoppers using a blower and a long tube. The packers then simply open a scissors-like valve to allow the peanuts to flow into the box, thereby surrounding the product.

Last, "Quadrapak ®" is a new product on the market that is made of recycled corrugated cardboard. The material is shredded and then fan folded into strips. It's promise is limited because it does not flow through existing equipment, weighs the same as shredded paper, and costs as much as polystyrene void fill.

A need exists for a packing material that is effective and cost efficient. This packing material must be environmentally friendly. Namely, the material should be biodegradable, recyclable, recycled and reusable. Moreover, the packing material should be easily produced on-site with relatively inexpensive source material.

SUMMARY OF THE INVENTION

The present void fill system, also known as Corropak, replaces all other void fill materials. Corropak accomplishes this by shaping ordinary scrap cardboard, chipboard, corrugated board, or other suitable materials, collectively called either "corrugated materials" or "corrugated board" into a novel and nonobvious configuration. This useful configuration allows the Corropak to interlock with surrounding Corropak void fill material. The material is typically shaped like the uprights in football or a block "Y" design. Thus, the void fill material is designed to effectively interlock with adjacent pieces of void fill material for increased cushioning.

Unlike polystyrene void fill, Corropak is environmentally safe. Corropak is produced from corrugated material, a blend of paper and starch. Corropak recycles discarded corrugated material into a new product that can be reused multiple times. When the void fill is worn out, it is collected and made into new containerboard. Moreover, Corropak does not carry the static charge that styrofoam peanuts carry.

Corropak is usually produced from surplus corrugated board. The board test is typically #150, #175, #200, #275, or #350. Wall thickness can be singlewall or doublewall. The board fluting can be A, B, C, E, or Asian board. The design of Corropak void fill promotes the interlocking of the Corropak pieces to reduce settling of the package contents and to increase cushioning properties. Each "finger" of the void fill can be scored to more easily bend. This design absorbs more space per piece and provides additional impact protection. Further, because Corropak can be made from fluted corrugated board, it provides a minimum of cushioning at least as thick as the corrugated board. This provides added protection to the products packed in it. Corropak will also help increase the amount of chipboard that is recycled for the same reasons.

Corropak should help reduce the number of trees necessary to make corrugated board by increasing the demand for used corrugated boxes. American container manufacturers are building more efficient recyling plants. However, only 50% of corrugated board is recaptured and only 21% is recycled. Corropak will make more companies and individuals aware of saving boxes. Also, many more companies and retail outlets will have containers specifically for surplus and scrap corrugated materials. It is hoped Corropak will help increase the amount of recycled board to over 90% of production.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
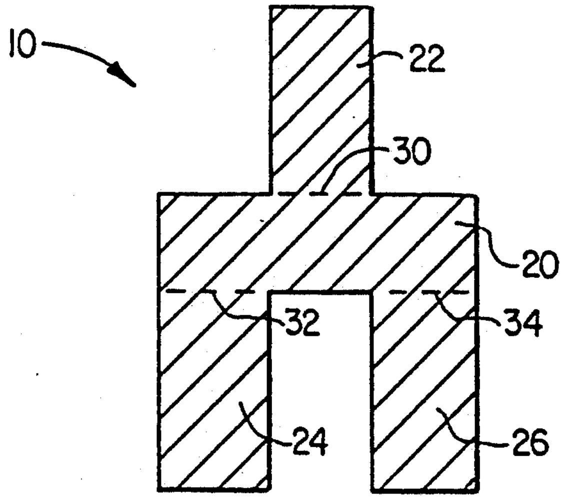
FIG. 1 is a flat view of the "block Y" embodiment of the present void fill material.

The present invention relates to an improved packing material that overcomes many of the disadvantages found in the prior art. A void fill material 10 embodying the present invention is disclosed in FIG. 1. Void fill material 10 is comprised of a primary section 20 and, in a preferred embodiment, three appendages or "fingers" 22, 24, 26. Typically, a first finger 22 is attached to one side of primary section 20, while a second and third finger 24, 26 are located on the opposite side of primary section 20. The intersection of each finger 22, 24, 26 with primary section 20 can be scored to allow for bending of each finger away from the plane defined by primary section 20. The first, second and third fingers can have a length to width ratio of between 3:1 and 1:1. Likewise, the primary section can have a length to width ratio of between 3.25:1 and 1:1.

In a first embodiment, the first finger 22 can be 1 inch in length and ½ inch in width. The second and third fingers 24, 26 can be 1 inch in length by 9/16 inch in width. The primary section 20 can be 1⅝ inch in length and ½ inch in width. The second and third fingers 24, 26 are separated by a distance of ½ inch. Thus, the first finger 22 of one piece of packing material 10 can engage the area between the second and third fingers 24, 26 of an adjacent piece of packing material. Of course, the dimensions provided describe only one embodiment of the invention, and can be altered to suit an individual's needs. In an alternate embodiment, the packing material can comprise a primary section with only a second and third finger extending therefrom.

Figure 2:
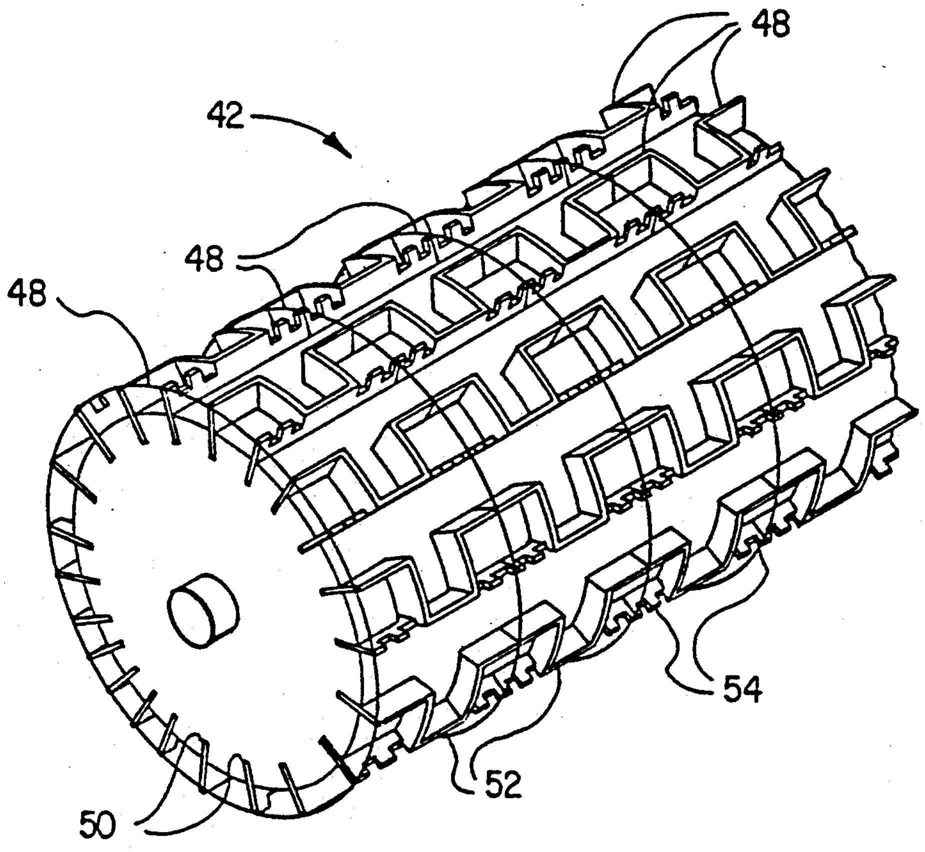
FIG. 2 is a detailed view of the cutting roller used to produce the present void fill material.
Figure 3:
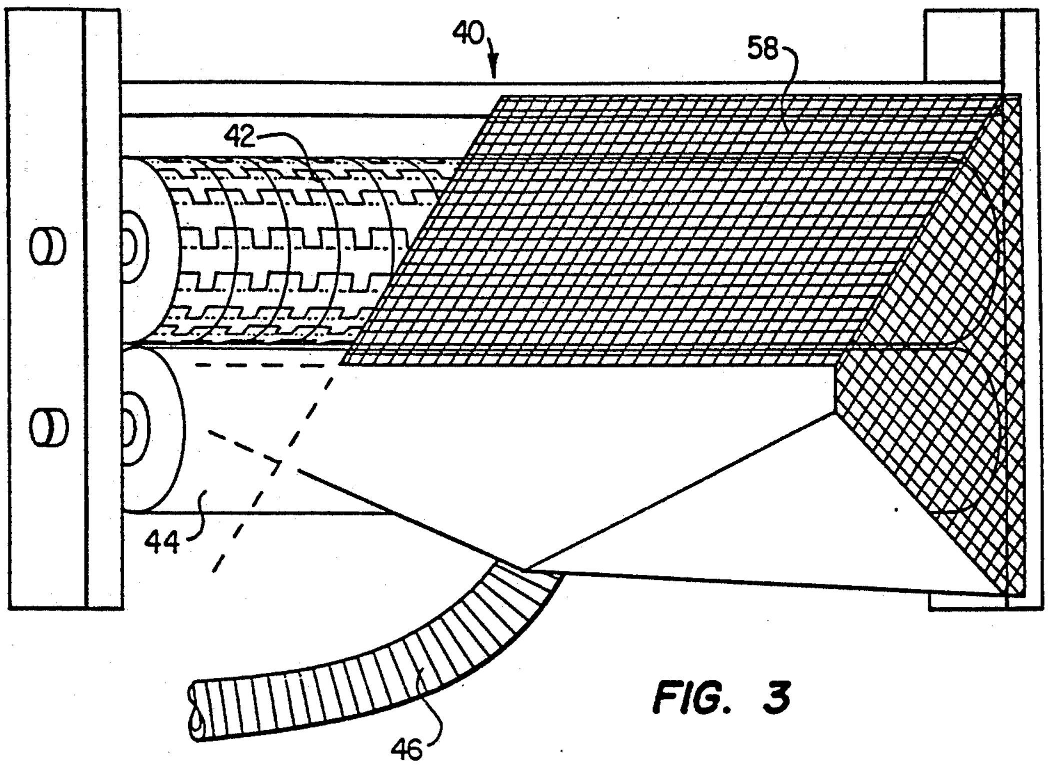
FIG. 3 is a diagram of the equipment used to produce and collect the present void fill material.
Figure 4:
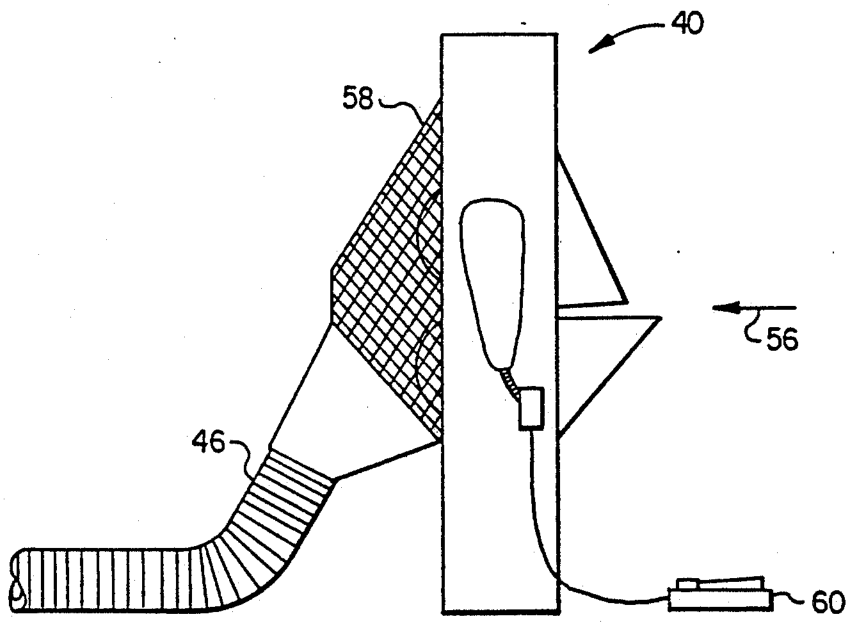
FIG. 4 is a side view of the equipment used to produce and collect the present void fill material.

FIG. 2 is a detailed view of the cutting roller used to produce the present void fill material 10. Referring to FIGS. 2, 3 and 4, the general design of the Corropak machine is a machine that uses two large rollers, one being the cutter 42 and the other being the striking surface 44, turning in opposite directions. The corrugated is fed between these two rollers as shown by arrow 56. As it passes between the rollers, it is cut into the disclosed design. As it passes out of the rollers, it is drawn into the collection hoppers by a vacuum system 46. From there it is blown into the dispensing hoppers for use. Protective screening 58 is attached to the Corropak machine 40 to catch the cut packing material as it exits the rollers 42, 44. Each cutter 42 comprises a generally cylindrical roller with a plurality of cutting blades 48 removably attached thereto. Each blade 48 has a cutting edge 52 and a perforating edge 54. The blades 48 attach to the roller 42 by fitting into grooves 50. A foot pedal 60 can control the Corropak machine.

The unique design of the cutting roller uses a set of blades 48 to provide the necessary pressure to do the cutting. This blade pattern forms the void fill material design and also provides easy replacement of worn or damaged blades. There are several advantages of this design. A primary consideration is the ease of blade replacement. This reduces downtime and allows a company to change blades themselves. They may then send them to the distributor for sharpening or replacement. Another advantage is the economy of mass production. All machines will use the same blades. The difference is the width of the machine and rollers.

In a preferred embodiment, the diameter of the rollers is 11.45 inches. Each revolution will produce over 800 pieces of void fill material. At the preferred speed of one second per revolution, a 36 inch machine will produce over 40,000 pieces per minute. No waste is produced in the conversion process. In addition to the rollers, other pieces of equipment can be added. For example, a metal detector could be added to detect metal staples before they damage the cutting blades. The detector would shut down the Corropak machine when a staple or other piece of metal is found. Additionally, a box splitter can be used for taking a taped box and breaking it down into a flat piece of corrugated that will feed through the machine.

FIGS. 3 and 4 are diagrams of the equipment used to produce and collect the present void fill material 10. A blower may be used for blowing the Corropak through the ducting and into the hoppers. This allows the Corropak to be "poured" through the same equipment as other void fills. A hopper is a large bag suspended from the ceiling which stores void fill. Hoppers have a scissor closure which allows the void fill to be poured into the containers being packed. Recycling bins for collection and storage of surplus corrugated board may also be utilized. Last, bagging equipment may be used for bagging the present void fill material for resale or distribution. Small users can then purchase bagged Corropak for use.

Figure 5:
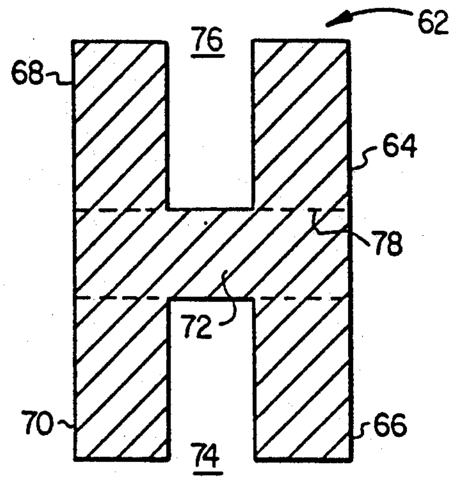
FIG. 5 is a flat view of a "H" embodiment of the present void fill material.

FIG. 5 is a flat sectional view of an "H" embodiment 62 of the present void fill material. The "H" void fill 62 is comprised of four limbs 64, 66, 68, 70 attached to a primary section 72. Scoring 78 can be applied to the "H" void fill to increase its utility. In use, the scoring will allow the limbs to bend from the primary section 72. Scoring 78 is shown at the intersection of each limb 64, 66, 68, 70 and the primary section 72. However, the scoring can be applied at any location on the "H" void fill. Limbs 64 and 68 are separated by space 76 while limbs 68 and 70 are separated by space 76. Each space 74, 76 is typically the same width as each limb. Each limb is between ⅛ and 15/16 inches in width and ½ and 2 inches in length. The overall dimension of the "H" embodiment is between ½ and 3 inches in width and 1 and 3 inches in length. Preferably, the "H" embodiment is 1¼ inches in width and two inches in length. The thickness will vary according to the corrugated material used, but is typically between 1/16 and ⅜ inches.

Figure 6:
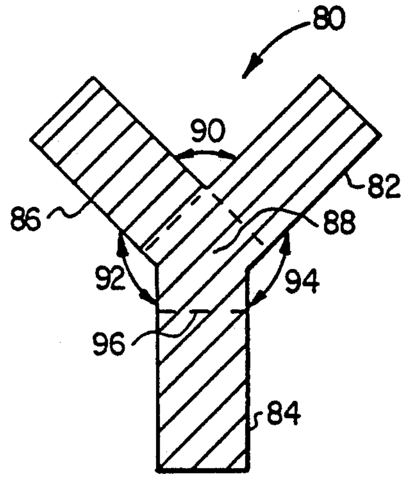
FIG. 6 is a flat view of an "angled Y" embodiment of the present void fill material.

FIG. 6 is a flat sectional view of an "angled Y" embodiment of the present void fill material. The "angled Y" void fill 80 is comprised of three limbs, 82, 84, 86 attached to a primary section 88. Scoring 96 can be applied to the "angled Y" void fill to increase its utility. Scoring 96 is shown at the intersection of each limb 82, 84, 86 in the primary section 88. However, the scoring can be applied at any location on the "angled Y" void fill. Limbs 86 and 82 are separated by a first angle 90. Limbs 82 and 84 are separated by a second angle 94. Limbs 84 and 86 are separated by a third angle 92. Each angle 90, 92, 94 is typically 120°. However, each angle may vary with no single angle being greater than 180°.

Each limb 82, 84, 86 is between ⅛ and 15/16 inches in width, and between ½ and 2 inches in length. The overall dimensions of the "angled Y" embodiment 80 is between ½ and 3 inches in width, and between 1 and 3 inches in length. Preferably, the "angled Y" embodiments is 1¼" in width and 2" in length. The thickness will vary according to the corrugated material used, but is typically between 1/16 and ⅜ inches.

Figure 7:
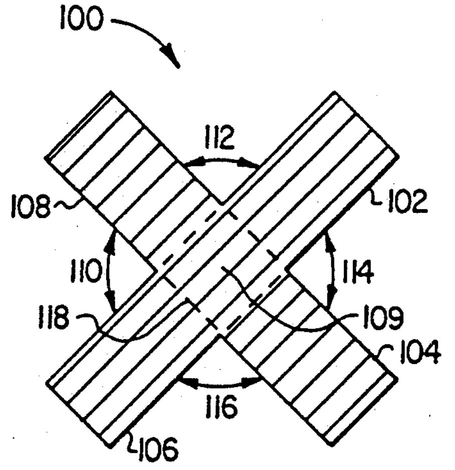
FIG. 7 is a flat view of a "X" embodiment of the present void fill material.

FIG. 7 illustrates an "X" embodiment 100 of the present void fill material. The "X" void fill 100 is comprised of four limbs 102, 104, 106, 108 attached to a primary section 109. Scoring 78 can be applied to the "X" void fill to increase its utility. Scoring 118 is shown at the intersection of each limb 102, 104, 106, 108 and the primary section 109. However, the scoring can be applied at any location on the "X" void fill. Limbs 102 and 104 are separated by angle 114. Limbs 104, 106 are separated by an angle 116. Limbs 106 and 108 are separated by an angle 110. Limbs 108 and 102 are separated by an angle 112. Each angle 110, 112, 114, 116 is typically 90°. However, each angle may differ, with no single angle being greater than 180°. Each limb 102, 104, 106, 108 is between ⅛ and 15/16 inches in width, and between ½ and 3 inches in length. The overall dimension of the "X" embodiment 100 is between ½ and 3½ inches and width, and between 1 and 4 inches in length. Preferably the "X" embodiment is 1¼" in width and 2" in length. The thickness will vary according to the corrugated material used, but is typically between 1/16 and ⅜ inches.

Figure 8:
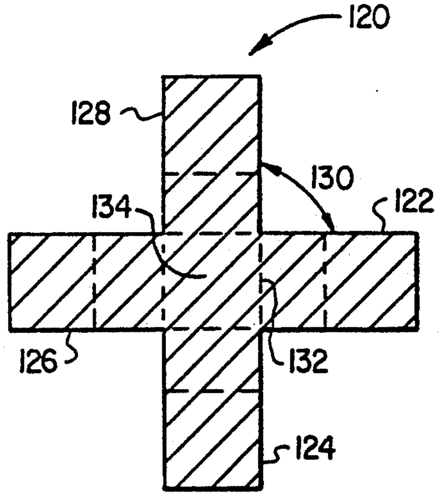
FIG. 8 is a flat view of a "cross" embodiment of the present void fill material.

FIG. 8 illustrates a "cross" embodiment 120 of the present void fill material. The "cross" void fill 120 is comprised of four limbs 122, 124, 126, 128 attached to a primary section 134. Scoring 132 can be applied to the "cross" void fill to increase its utility. Scoring 132 is shown at an intermediate portion of each limb as well as at the intersection between each limb and the primary section. In other words, multiple scoring can be applied to any limb, or no scoring need be applied at all. Each limb is separated by an angle 130 as shown. Angle 130 is 90°. Each limb 122, 124, 126, 128 is between ⅛ and 15/16 inches in width, and between ½ and 3 inches in length. The overall dimension of the "cross" void fill is between ½ and 3½ inches in width, and between 1 and 4 inches in length. Preferably, the "cross" void fill is 1¼" in width and 2" in length. The thickness will vary according to the corrugated material used, but is typically between 1/16 and ⅜ inches.

In summary, as the trend continues away from plastic packaging, corrugated material and paper products will continue to be in greater demand. Products that allow reuse of existing corrugated board without requiring additional manufacture will provide a great benefit to the economy and the environment. In 1990, production capacity of U.S. mills was seventy-seven million short tons paper and paperboard. Of this, twenty-four million short tons (approximately 31%) was containerboard. Unfortunately, only twenty-one million short tons of all types of wastepaper was recycled. This is only 30% of all paper produced domestically last year. This equates to fifty-six million short tons of paper and paperboard being discarded in 1990. Of the twenty-four million tons of containerboard produced, approximately 30% was recycled. This means that over sixteen million short tons of containerboard became scrap. With Corropak weighting approximately 3.45 pounds per cubic foot, one ton of waste corrugated board will produce 580 cubic feet of the present void fill material. Thus, the sixteen million tons of surplus corrugated would convert to over nine billion cubic feet of Corropak.

In comparison, polystyrene void fill usage was approximately two and one half billion cubic feet in 1990. This allows the void fill market demand to increase four-fold without a shortage of corrugated packaging materials. Thus, the present void fill material is a direct solution to the excess corrugated material problem and the elimination of polystyrene void fill. Corropak will extend the useful life of existing corrugated materials by several months or years. Corropak can be reused many times over. When the Corropak is worn out, it can be gathered and recycled into new containerboard.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A void fill material for use within a container around a product comprising:

(a) a primary section defining a primary plane; and (b) at least two limbs extending from the primary section, wherein the void fill material is made of a corrugated material.

2. The void fill material of claim 1 further comprising:

(c) scoring of the primary section.

3. The void fill material of claim 1 further comprising:

(c) scoring of at least one of the at least two limbs.

4. The void fill material of claim 1 further comprising:

(c) scoring at the intersection between the primary section and at least one of the at least two limbs.

5. The void fill material of claim 1 wherein the void fill material is configured as a block Y.

6. The void fill material of claim 1 wherein the void fill material is configured as a block H.

7. The void fill material of claim 1 wherein the void fill material is configured as an angled Y.

8. The void fill material of claim 1 wherein the void fill material is configured as an X.

9. The void fill material of claim 1 wherein the void fill material is configured as a cross.

10. The void fill material of claim 1 wherein said corrugated material is comprised of corrugated cardboard.

11. The void fill material of claim 1 wherein said corrugated material is comprised of chipboard.

12. The void fill material of claim 1 wherein the at least two limbs are configured to interlock with the at least two limbs on adjacent pieces of void fill material.

13. A void fill material cut from corrugated materials for use within a container around a product comprising:

(a) a primary section defining a primary plane;

(b) three limbs extending from said primary section, wherein the void fill material is made of a corrugated material.

14. The void fill material of claim 13 wherein the void fill material is configured as a block Y.

15. The void fill material of claim 13 wherein the void fill material is configured as an angled Y.

16. A void fill material cut from corrugated materials for use within a container around a product comprising:

(a) a primary section defining a primary plane;

(b) four limbs extending from said primary section, wherein the void fill material is made of a corrugated material.

17. The void fill material of claim 13 wherein the void fill material is configured as a block H.

18. The void fill material of claim 13 wherein the void fill material is configured as an X.

19. The void fill material of claim 13 wherein the void fill material is configured as a cross.

* * * * *